United States Patent [11] 3,547,177

| [72] | Inventor | Irvin L. Valley<br>1515 Narrows Drive, Tacoma, Wash. 98406 |
|---|---|---|
| [21] | Appl. No. | 778,150 |
| [22] | Filed | Nov. 22, 1968 |
| [45] | Patented | Dec. 15, 1970 |

[54] TIRE CHAIN APPLICATOR FOR DUAL WHEELS
8 Claims, 5 Drawing Figs.

[52] U.S. Cl. .................................................. 152/220, 152/213
[51] Int. Cl. .................................................. B60c 27/22
[50] Field of Search .......................................... 152/220, 213, 233

[56] References Cited
UNITED STATES PATENTS
1,246,132 11/1917 Mayer et al. ............... 152/220
2,077,286 4/1937 Tooley ...................... 152/220

*Primary Examiner*—James B. Marbert
*Attorney*—Eugene M. Eckelman

ABSTRACT: The tire chain applicator has a tubular handle having open ends and having an aperture in its wall between the ends. A line slidably extends through the tubular handle and has a portion thereof projecting from each end of the handle as well as from an aperture between the ends of the handle. Hook means are provided on the ends of the projecting line portions for connection to the ends of a tire chain to be pulled onto the dual wheel. Preferably, the line comprises a flexible cable coated with a plastic or the like to provide protection for the line as well as to increase its surface lubricity.

PATENTED DEC 15 1970    3,547,177
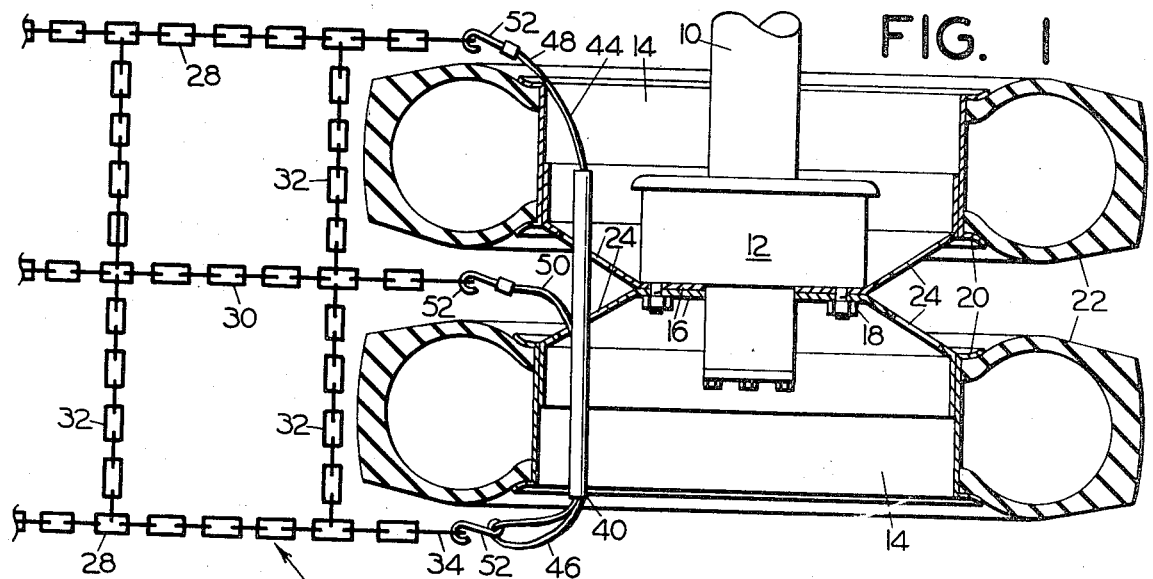
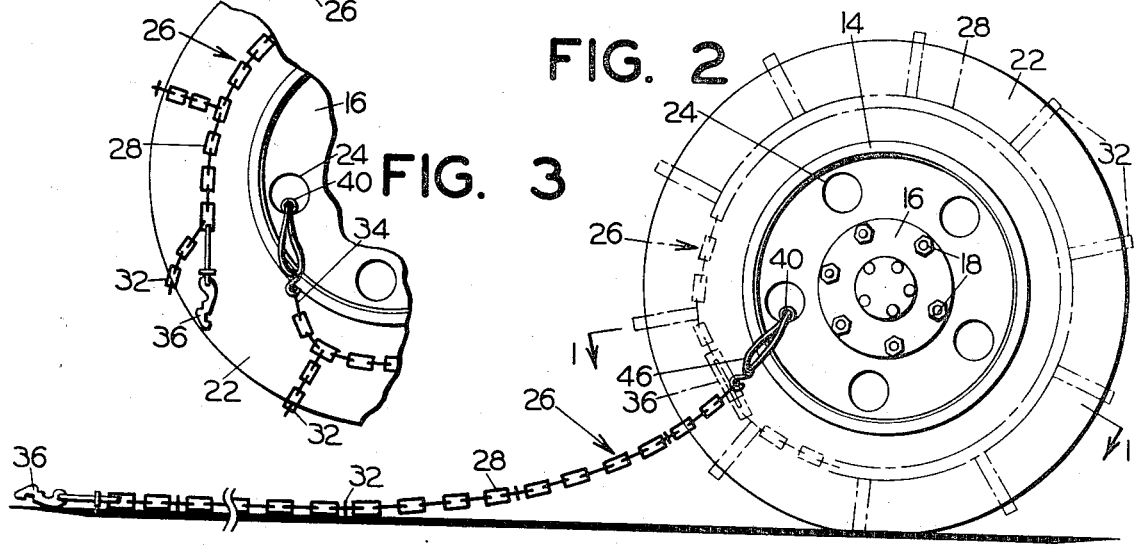
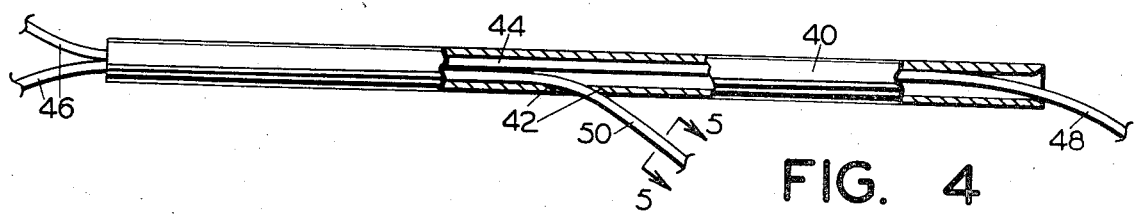
INVENTOR.
IRVIN L. VALLEY
BY Eugene M. Eckelman
ATTY.

TIRE CHAIN APPLICATOR FOR DUAL WHEELS

This invention relates to new and useful improvements in tire chain applicators and relates particularly to an applicator for applying chains to dual wheels.

The application of tire chains to vehicle wheels is a difficult task and is even more difficult when applying the chains to dual wheels in view of the heavy weight of the chains as well as the difficulty for the operator in placing the chains in an initial attaching position for wrapping around the wheels. It is an important objective of the present invention to provide novel means which simply and positively accomplish the initial attachment of one end of the chains to dual wheels.

As is well known, dual wheels comprise wheel plates which are integrated with a hub portion of the wheel and which have a plurality of apertures or hand holes adjacent the rim of the wheel. According to the present invention, a tubular handle with open ends has a connector line which is slidably disposed therein and which has portions projecting from the ends of the handle as well as from an aperture between the ends of the handle. This handle is arranged to be inserted in aligned apertures in the wheel plates and the projecting portions of the line are arranged to be connected to one end of a chain, whereby upon rotation of the wheel the handle is carried around therewith to pull the chain around the wheel.

Another object of the present invention is to provide a tire chain applicator of the type described wherein the line portions which project from the aperture intermediate the ends of the handle and from one end of the handle are both connected to the line portion which projects from the other end of said handle whereby the line portion which projects from the aperture intermediate the ends of the handle and the line portion which projects from the said one end of the handle can be extended and retracted by slidable movement of the line portion which projects from the said other end of the handle.

Other important objects of the invention are to provide a tire chain applicator of the type described wherein said handle is substantially rigid for easy handling and insertion into the wheel apertures; wherein the apertures between the ends of the handle is angled to provide easy sliding operation of the line from one end of said handle; and wherein said line preferably comprises a flexible cable having a plastic coating to provide protection for the cable as well as to increase its surface lubricity.

The invention will be better understood and additional objects will become apparent from the following description taken in connection with the accompanying drawings, wherein:

FIG. 1 is a sectional view taken through a dual wheel assembly and showing the present tire chain applicator in an initial position for applying chains to the wheel assembly;

FIG. 2 is a side elevational view of the wheel assembly, reduced in scale relative to FIG. 1, showing the tire chain applicator in an initial position;

FIG. 3 is a fragmentary side elevational view similar to FIG. 2 but showing the wheel assembly in a position wherein the chains are almost fully applied thereto;

FIG. 4 is a fragmentary elevational view, partly broken away and substantially enlarged with relation to the other FIGS. of the invention; and FIG. 5 is a cross-sectional view of a connector line forming a part of the invention, taken on the line 5–5 of FIG. 4.

The present tire chain applicator is intended for use with a dual wheel assembly of conventional construction. Such a wheel assembly is shown in FIGS. 1 and 2 and comprises an axle 10 having a hub portion 12 to which are secured wheels 14. Each of these wheels has a central plate 16 which is removably bolted to the hub by lug bolts 18. These wheel plates have outer rim portions 20 on which tires 22 are secured and also are suitably angled such that the two rim portions and tires have a lateral space therebetween. Plate portions 16 are provided with a plurality apertures or hand holes 24 adjacent the rim.

The numeral 26 designates generally a set of tire chains of conventional construction arranged to be mounted on the dual wheel assembly. Such tire chains comprise two outer longitudinal strips of chain 28 and a central longitudinal strip 30. The outer strips and central strip are connected by cross strips 32 which usually carry cleats. The strips 28 and 30 at one end terminate in loop portions or extra links 34, and the other ends of such strips terminate in catches 36 arranged for securing engagement with the loop portions 34 to hold the chains on the wheels.

According to the present invention, there is provided a substantially rigid tubular handle or member 40 which is arranged to be inserted in apertures 24 in the wheels in an initial tire chain applicating position, as will be described more fully hereinafter. This handle has an aperture 42 intermediate its ends, FIG. 4, and slidably disposed in the handle is a connector line 44. A portion 46 of the line projects from one end of the handle, a portion 48 projects from the other end of the handle, and a portion 50 projects from the aperture 42. All of the projecting portions 46, 48, and 50 terminate in hooks 52.

As a feature of the present invention, the projecting portion 46 of the line is connected individually to each of the projecting portions 48 and 50, and for this purpose it has double structure. To provide this novel arrangement the line 44 is of one piece which extends inwardly from the projecting portion 48 and is doubled back from the projecting portion 46 to extend out through the aperture 42 to form the projecting portion 50. With reference to FIG. 4, the aperture 42 is angled toward the end of the handle which has the projecting portion 46 to provide easy sliding movement toward and away from such end. Line 44 must be flexible, and for this purpose may comprise aircraft-type cable or the like. Preferably such cable is coated with plastic 54 or other substance, FIG. 5, which offers protection thereto as well as increasing the lubricity of its surface to provide easy sliding movement in the handle.

In the use of the present invention, the tire chain is first laid on the road surface in line with the wheel assembly, such as in back of said wheel assembly, with the loop portions 34 disposed at the end of the chain which is adjacent the wheel assembly. Handle 40 is then inserted through a pair of aligned apertures 24 in the wheel plate, preferably a pair of the apertures which are closest to the chain as it lies on the ground. It is understood that the wheel plates are selectively positioned on the hub 12 of the wheel such that apertures 24 in the two wheels are aligned laterally. In order to accomplish easy insertion of the handle 40 onto a pair of the apertures 24, the projecting portion 46 of the connector line is first pulled outwardly to retract the portions 48 and 50 of the line of maximum amount. Then, after the handle has been inserted into the apertures 24, the projecting portion 46 is pushed inwardly to extend the projecting portions 48 and 50 outwardly. With the latter projecting portions of the line extended, the operator can readily hook the end loops 34 of the chain on the hooks 52. After the hooks 52 of the projecting portions of the line 48 and 50 have been engaged with their respective loop portions 34 of the chain, the projecting portion 46 is pulled outwardly to retract the said projecting portions 48 and 50. Not only does this latter slidable movement of the line make the projecting portion 46 readily available for hooking to its respective loop portion 34 of the chain, but such movement also draws the end portion of the chain at the center and the far side of the wheel into fitting engagement with the wheels to hold the chain initially on the wheels.

After all the hooks 52 are engaged with the end loops 34 of the chain, the wheel assembly is rotated almost one revolution, as by driving the vehicle ahead, to wrap the chain around the assembly to a position as shown in FIG. 3. Thereupon, the present applicator may be detached from the chain and the chain latched in position by means of its loops 34 and catches 36. The present applicator can be used to pull the chains on tight so that there will be no flopping of said chains. Also, the present applicator can be used for installing single chains on an outside dual tire. This is accomplished by pulling in the end 48 to its end of the tube and using the ends 46 and 50 to attach the chains. The applicator can be used to attach chains on different types of wheel structures since all wheels have some type of opening therein through which the handle 40 may be inserted.

It is to be understood that the form of my invention herein shown and described is to be taken as a preferred example of the same and that various changes in the shape, size and arrangement of parts may be resorted to without departing from the spirit of my invention or the scope of the subjoined claims.

I claim:

1. a tire chain applicator for dual wheels of the type having wheel plates provided with rim portions supporting a pair of tires in laterally spaced relation and also provided with pairs of laterally aligned apertures disposed inwardly from the rims comprising:
    a. A tubular handle member;
    b. a line slidably disposed in said handle member and projecting from the latter adjacent adjacent opposed end portions thereof;
    c. said line being of sufficient length to extend approximately from one side of a set of dual wheels to the other side; and
    d. means on the projecting ends of said line arranged to hook said ends of the line onto an end of a tire chain on opposite sides of the wheel assembly upon first inserting said handle member in a pair of the laterally aligned apertures in the wheels, whereby a tire chain is arranged to be pulled onto the tires upon rotation of the wheels.

2. The tire chain applicator of claim 1 wherein said handle member is substantially rigid.

3. The tire chain applicator of claim 1 wherein said connector line comprises a flexible cable.

4. The tire chain applicator of claim 1 wherein said handle member has open ends through which opposed ends of said connector line project.

5. The tire chain applicator of claim 1 wherein:
    a. said connector line comprises a flexible cable; and
    b. said cable having a plastic coating for increasing its surface protection and surface lubricity.

6. The tire chain applicator of claim 1 wherein:
    a. said handle member has an aperture therein intermediate its ends;
    b. said connector line having a projecting portion extending slidably through said aperture in said handle member; and
    c. including means on the end of said projecting portion arranged to hook said projecting portion onto a center portion of the chain at the one end.

7. The tire chain applicator of claim 6 wherein said projecting portion of the line which projects from the aperture intermediate the ends of said handle member and one of the end projecting portions of the line are both connected to the other end projecting portion of the line, whereby the said projecting portion which projects from the aperture intermediate the ends of said handle member and the said one end projecting portion of the line can be extended and retracted by slidable movement of said other end projecting portion of the line with relation to the holder.

8. The tire chain applicator of claim 6 wherein said aperture in said handle member is angled inwardly toward one end of said tubular member to provide easy sliding movement of said projecting portion through said aperture in a direction toward and away from said one end.